United States Patent [19]

Stolz et al.

[11] Patent Number: 4,927,276
[45] Date of Patent: May 22, 1990

[54] POCKET CAGE

[75] Inventors: Robert Stolz, Schweinfurt; Knut Mirring, Gochsheim; Rudolf Hein, Hambach; Dieter Simon, Kolbingen; Lothar Raab; Peter Glatz, both of Mühlheim, all of Fed. Rep. of Germany

[73] Assignee: SKF GmbH, Schweinfurt, Fed. Rep. of Germany

[21] Appl. No.: 395,142

[22] Filed: Aug. 16, 1989

Related U.S. Application Data

[63] Continuation of Ser. No. 130,000, Dec. 8, 1987, abandoned.

[30] Foreign Application Priority Data

Dec. 10, 1986 [DE] Fed. Rep. of Germany ....... 3642114

[51] Int. Cl.$^5$ ............................................. F16C 33/54
[52] U.S. Cl. ..................................... 384/572; 384/534
[58] Field of Search ............... 384/572, 580, 575, 574, 384/534

[56] References Cited

U.S. PATENT DOCUMENTS

| | | | |
|---|---|---|---|
| 1,159,072 | 11/1915 | Newmann | 384/580 |
| 2,202,792 | 5/1940 | Göthberg | 384/575 |
| 3,442,562 | 5/1969 | Schaeffler et al. | 384/575 |

FOREIGN PATENT DOCUMENTS 1391401 11/1936 Fed. Rep. of Germany .

Primary Examiner—Lenard A. Footland
Attorney, Agent, or Firm—Rosen, Dainow & Jacobs

[57] ABSTRACT

A pocket cage formed from a deformable sheet has a pair of side rings connected by a plurality of webs, each web having a projection comprising a folding of web material formed by bending at a plurality of bending points. At least the material in the middle of each web has reduced resistance to bending relative to the material in areas of each web other than the bending points. This folding is produced by applying opposing pressing forces on the front faces of the side rings using a tool. By placement of the middle bending point on either the outer surface or the bore surface of the web, the projection can be suitably selected to be radially inwardly or outwardly directed respectively.

5 Claims, 2 Drawing Sheets

POCKET CAGE

This application is a continuation Ser. No. 130,000 filed Dec. 8, 1987, now abandoned.

FIELD OF THE INVENTION

This invention relates to a pocket cage stamped from a deformable sheet, for example, sheet metal, and having two side rings connected by webs.

BACKGROUND OF THE INVENTION

A pocket cage of the foregoing type is disclosed in DE-GM No. 1391401. The pocket cage disclosed therein is made from a relatively thin sheet and comprises two side rings connected by webs extending therebetween. Thereby, pockets, for example, for rollers, are produced which have a dimension in the axial direction which is considerably greater than the roller length. The middle portion of each web is folded by application of opposing pressure on the side rings with the aid of a special tool, so that radial projections are produced, which form radial stops, that is, additional guide surfaces, for the rollers. The projections are produced by forming a pair of bending lines, each being nearest to a respective side ring, and a middle bending line lying between the pair of bending lines, and depending on requirements, a projection can be directed radially outwardly or inwardly. A similar construction of the projections with correspondingly positioned bending lines is possible with a special tool which must be applied at the web areas which undergo bending. The formation of these projections when the rollers are inserted and the raceways are positioned is not possible or requires at the very least complicated tools. Furthermore, the formation of the projections when a thicker sheet is being utilized, which is often necessary to satisfy stability requirements, is made more difficult, if not impossible. This type of assembly is useful, however, for many types of rolling bearings which have a compact, not diverging, unit comprising, for example, an outer ring, rollers and cage wherein a smooth cylindrical shaft is introduced by subsequent installation.

SUMMARY OF THE INVENTION

The object of the invention is to produce a pocket cage of the above-described type whereby the use of a tool which must be applied at the bending areas for forming the projections is eliminated and the use of thicker sheet is made possible.

This object is realized by providing a reduction in the bending resistance of material in at least the area of a middle bending line on each web.

This reduction of the bending resistance of the material produces a desired bending line, which results in the formation of uniform foldings on all of the webs at the same axial position. This requires only two tool parts which engage the front faces of the side rings by radial form-locking and which apply opposing coaxial pressing forces thereon. By incorporating material portions having reduced bending resistance at the center of the outer surface or the bore surface of the web, the radial formation of the projections can be directed radially inwardly or outwardly respectively. The bending regions located between the web center and the respective side rings are formed automatically and all webs of the pocket cage lie uniformly at the same axial locations while the tool ensures the relative axial displacement of the side rings.

In accordance with a further characteristic of the invention, all of the bending lines are formed by material portions of the web which have reduced resistance to bending, for example, reduced thickness. As a result the bending areas between the web center and the side rings are also formed as predetermined bending lines. This is advantageous, in particular, when thick sheet is used, because it leads to precisely and uniformly folded projections. Moreover, a limited deformation energy for a thicker starting material is predetermined by proper selection of the mold depth and thereby the thickness of the remainder of the sheet at the predetermined bending lines.

In accordance with another feature of the invention, the bending lines are formed by notches running in the circumferential direction and extending depthwise in the direction of the sheet thickness. Although reductions in material thickness of every type will produce a predetermined bending line, it is advantageous that they extend depthwise in the direction of the sheet thickness and run lengthwise along the bending line since the web width is generally greater than the sheet thickness.

In accordance with another preferred embodiment of the invention, the thickness of the web material in the direction of the sheet thickness is reduced steadily from the locations of the bending regions nearest to the respective side rings to the middle bending region of minimum thickness. This type of weakening of the web material can be achieved in a simple manner by stamping the webs during punching of the pockets. If the stamping covers too large a volume of material, this can lead to stretching of the web, which, however, can be taken into account. The manufacture of this reduction of the material bending resistance is also possible, however, using other known processing methods if stamping would lead to a too great compression of the web material. In accordance with the disclosed embodiment, the sheet thickness is a minimum in the area of the central bending line. The remaining material at the center of the web folds easily during bending in the regions where the reduction in thickness begins, the formation of the projection finishing when the folded portions of the projection abut against each other. In this way a particularly stable cage can be produced with precisely aligned web side surfaces.

BRIEF DESCRIPTION OF THE DRAWINGS

The preferred embodiment of the invention will be described in detail hereinafter with reference to the drawings, wherein.

DETAILED DESCRIPTION OF THE PREFERRED EMBODIMENTS

Figure 2:
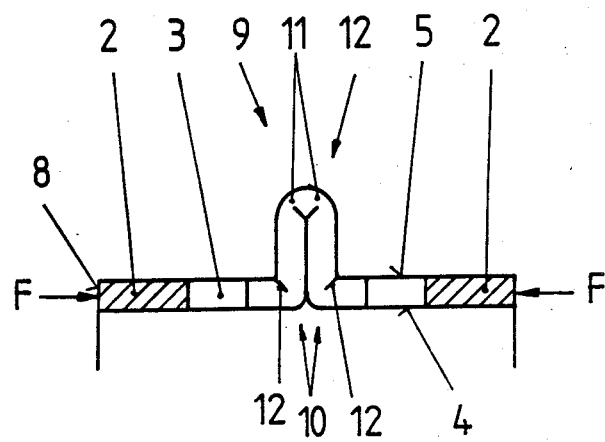
FIG. 2 shows the cage of FIG. 1 after formation of the projections by folding.
Figure 1:
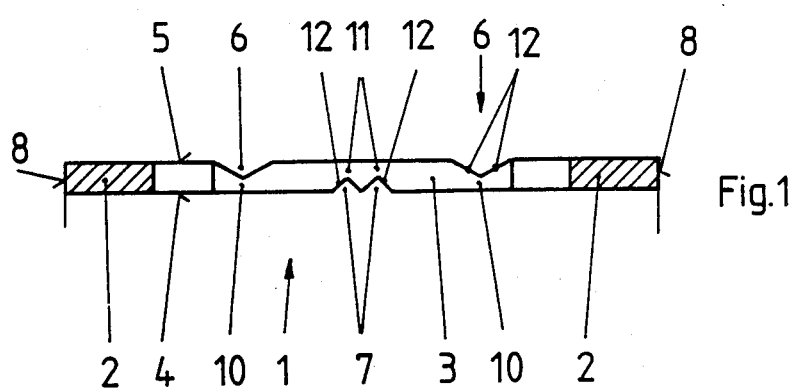
FIG. 1 is a partial longitudinal sectional view of a pocket cage before the formation of projections with predetermined bending lines formed by notches.
Figure 4:
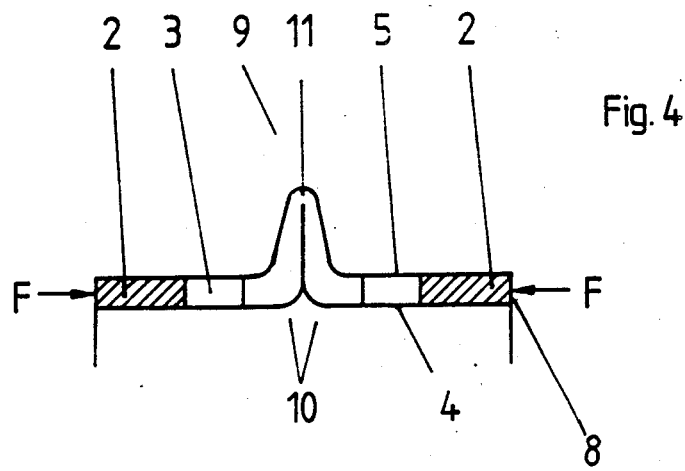
FIG. 4 shows the cage of FIG. 3 after formation of the projections by folding.

FIG. 1 shows an intermediate stage in the manufacture of a pocket cage for rollers formed, for example, for a tubular section, in which pockets 1 are stamped, these pockets having an axial length substantially greater than that of the rollers (not shown) which are to be inserted later. As a result, two side rings connected by a plurality of webs are formed. The material is weakened, that is, its resistance to bending is decreased, on the bore surface 4 as well as on the outer surface in the area of the webs by forming notches 6, 7 therein. The notches extend lengthwise in the circumferential direction and reduce the thickness of the sheet material. The side rings 2 are pressed toward one another by applying opposing pressing forces F, as depicted in FIG. 2, using coaxially directed tools (not shown) acting on the front faces 8 of the side rings 2. The folding of each of the webs 3 begins when the opposing pressing forces are applied. FIG. 2 shows the formation of radial projections 9 upon completion of the folding. The bending in the respective directions occurs automatically along the bending lines 10, 11 formed by the notches 6, 7. Because of the notches 6 at the desired bending lines 10 respectively closest to the side rings on the outer surface 5 and the desired intermediate bending lines 11 on the bore surface 4, the remaining material portions of the desired bending lines 10, 11 are negligibly radially displaced, by means of which the bending direction is determined. To ensure that the web 3 can be folded by 180° in its middle, two bending lines 11 are formed by providing two narrow notches 7 juxtaposed in parallel, as shown in FIG. 1, the notches each having a V-shaped cross section. The opposing faces of each notch abut after the bending, as shown in FIG. 2. This also applies in the case of the surfaces 12 of the notches 6 of V-shaped cross section, which form the desired bending lines 10 nearest to the side rings.

Figure 3:
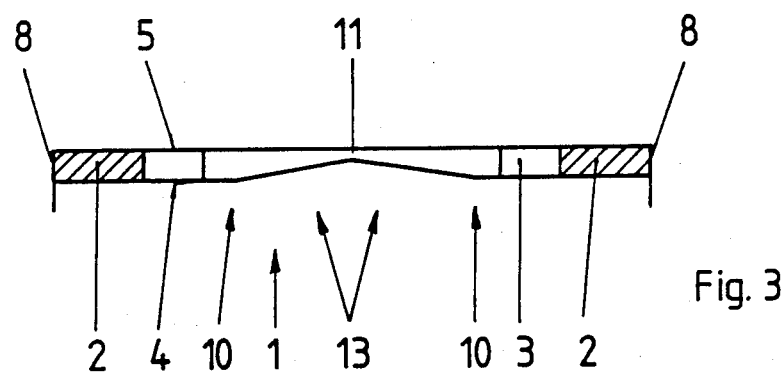
FIG. 3 is a partial longitudinal sectional view of a pocket cage before the formation of projections with a large surface area of reduced thickness.

FIG. 3 shows an intermediate stage in the manufacture of another preferred embodiment of the pocket cage in accordance with the invention. In this embodiment each web 3 is provided with a large area of reduced thickness, the thickness varying continuously in both axial directions from a minimum at the center of the web, forming a central bending line 11, to the respective bending areas 10 arranged between the central bending line 11 and the respective side rings 2. After the coaxial opposing pressing forces F have been applied to the front faces of the respective side rings 2, in the manner already described, a radial projection 9 is formed as the result of the large area of reduced thickness having a V-shaped cross section. In accordance with this embodiment, considerably more work is necessary to deform the material in the bending areas, especially the respective bending areas nearest the side rings.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a pocket cage, formed from a deformable sheet, having first and second side rings and a plurality of webs extending therebetween, each web having a projection in its middle area when formed comprising a folding formed by bending at a plurality of bending points, including a bending point at the middle of each web, the improvement wherein at least the material in the middle of each web of said deformable sheet has reduced resistance to bending relative to the segments of material of the respective web adjoining the bending points and on either side of said bending points; and whereby bending produces a radial projection in the middle of each web, comprising a felded laminate, each lamina tapering steadily radially outwardly from the radius of the side rings to the region of a central bend.

2. The pocket cage as defined in claim 1, wherein all of said bending points comprise areas of the web material which have reduced resistance to bending relative to the material in other areas of said web.

3. The pocket cage as defined in claim 1, wherein said bending points comprise a first bending area located closer to said first side ring than said second side ring, a second bending area located closer to said second side ring than said first side ring, and a third bending area midway between said first and second side rings, the thickness of each web decreasing steadily from said first and second bending areas to said third bending area.

4. In a pocket cage, formed from a deformable sheet, having first and second side rings and a plurality of webs extending therebetween, each web having a projection in its middle area when formed comprising a folding formed by bending at a plurality of bending points. including a bending point at the middle of each web, the improvement wherein at least the material in the middle of each web of said deformable sheet has reduced resistance to bending relative to the segments of material of the respective web adjoining the bending points and on either side of said bending points; and wherein all of said bending points comprise areas of the web material which have reduced resistance to bending relative to the material in other areas of said web; and wherein each of said areas of reduced resistance to bending comprises a notch running lengthwise in a circumferential direction and extending depthwise in a direction of the thickness of said deformable sheet.

5. The pocket cage as defined in claim 4, wherein each web has first through fourth notches, said first notch being formed on the outer surface of said web at a point closer to said first side ring than said second side ring, said second notch being formed on the outer surface of said web at a point closer to said second side ring than said first side ring, and said third and fourth notches being formed on the inner surface of said web, between said first and second notches, and on either side of the midpoint of said web.

* * * * *

UNITED STATES PATENT AND TRADEMARK OFFICE
CERTIFICATE OF CORRECTION

PATENT NO. : 4,927,276

DATED : May 22, 1990

INVENTOR(S) : Robert Stolz, et al.

It is certified that error appears in the above-identified patent and that said Letters Patent is hereby corrected as shown below:

Column 4, line 16, change "felded" to --folded--.

Signed and Sealed this

Twenty-sixth Day of January, 1993

Attest:

DOUGLAS B. COMER

*Attesting Officer*  *Acting Commissioner of Patents and Trademarks*